Sept. 5, 1950 A. H. DICKINSON 2,521,350

ELECTRONIC COUNTER

Filed Nov. 24, 1947 2 Sheets-Sheet 1

INVENTOR
ARTHUR H. DICKINSON
BY John R. Shipman
ATTORNEY

Sept. 5, 1950 A. H. DICKINSON 2,521,350

ELECTRONIC COUNTER

Filed Nov. 24, 1947 2 Sheets-Sheet 2

Fig. 2.

Trigger Circuits

| Input Impulse | I | | II | | III | | IV | |
|---|---|---|---|---|---|---|---|---|
| | $V_1$ | $V_2$ | $V_3$ | $V_4$ | $V_5$ | $V_6$ | $V_7$ | $V_8$ |
| 0 | X | 0 | X | 0 | X | 0 | X | 0 |
| 1 | 0 | X | X | 0 | X | 0 | X | 0 |
| 2 | X | 0 | 0 | X | X | 0 | X | 0 |
| 3 | 0 | X | 0 | X | X | 0 | X | 0 |
| 4 | X | 0 | X | 0 | 0 | X | X | 0 |
| 5 | X | 0 | X | 0 | X | 0 | 0 | X |
| 6 | 0 | X | X | 0 | X | 0 | 0 | X |
| 7 | X | 0 | 0 | X | X | 0 | 0 | X |
| 8 | 0 | X | 0 | X | X | 0 | 0 | X |
| 9 | X | 0 | X | 0 | 0 | X | 0 | X |
| 10 | X | 0 | X | 0 | X | 0 | X | 0 |

Note:-
X = Conductive
0 = Non-Conductive

INVENTOR
ARTHUR H. DICKINSON
BY John R. Shipman
ATTORNEY

Patented Sept. 5, 1950 2,521,350

UNITED STATES PATENT OFFICE 2,521,350

ELECTRONIC COUNTER

Arthur H. Dickinson, Greenwich, Conn., assignor to International Business Machines Corporation, New York, N. Y., a corporation of New York Application November 24, 1947, Serial No. 787,663

1 Claim. (Cl. 250—27)

This invention relates to an electronic counting circuit and is particularly directed to a counting circuit of the series chain type for counting a succession of discrete voltage impulses.

In an electronic counter of the series chain type, a plurality of electronic trigger circuits are frequently employed. Each of such trigger circuits has two different stable conditions which it may assume alternately and is changed or switched from either condition to the other condition upon proper application to the trigger circuit of a voltage impulse of a predetermined character.

It is a familiar practice to connect such trigger circuits in a series chain so that upon two changes of the condition of any particular trigger circuit, a single output voltage impulse is supplied therefrom to the next succeeding trigger circuit in the chain to switch that next trigger circuit. In such devices, by applying the input voltage impulses which are to be counted to the first trigger circuit in the chain only, a multi-denominational counter in the binary system of numerical notation is provided.

Since the binary system is difficult to interpret and is not satisfactory for many operations, binary counters, as described, are sometimes modified to produce counters for use with a more familiar numerical system. A typical modification is one in which counting progresses in a binary fashion but at some point in the counting, the condition of stability of one or more of the trigger circuits relative to the other trigger circuits is changed from that corresponding to a binary operation, so that all of the trigger circuits are returned to their initial or zero condition of stability by the tenth count. This change is often accomplished by a feed-back capacitor or capacitors interconnecting certain trigger circuits for feeding voltage pulses, other than the regular output impulses, from one trigger circuit to another. The original setting or resetting of the trigger circuits to their initial or zero condition of stability is usually effected by operation of a switch to change the grid voltage on one of the pair of electronic tubes which is incorporated in each trigger circuit.

It is an object of my invention to provide a new and improved electronic counter of the series chain type by which voltage impulses may be counted in the quinary system.

Another object is to provide a novel electronic counter for counting in the scale of ten at a more rapid rate than heretofore.

An additional object is to provide a modified binary counter for counting in the scale of ten which avoids the use of feedback capacitors. In this connection, it is to be noted that my invention arises in part from the realization that the use of feedback capacitors with their reactive effects tends to make the counter phase and frequency sensitive and consequently reduces the maximum speed of operation.

Still another object is to provide a novel electronic counter which may be used in counting in the scale of five or in the scale of ten.

Another object is to provide an electronic counter for counting in the bi-quinary system.

A further object is to provide a novel electronic counter of the series chain type employing a plurality of trigger circuits in which the trigger circuits are responsive to a series of discrete voltage impulses to operate sequentially in a predetermined pattern with the pattern being completed by the first five impulses supplied thereto and repeated with every five succeeding impulses.

Another object is to provide a novel electronic counter incorporating a plurality of trigger circuits arranged to complete a predetermined pattern of sequential operation with the first five voltage impulses counted and to repeat the pattern with every five succeeding impulses, and which also incorporates an additional trigger circuit responsive to operation of the other trigger circuits to provide a pattern of sequential operations of all of the trigger circuits which is completed with the first ten impulses counted and repeated with every ten succeeding impulses.

A still further object is to provide an electronic counter employing a plurality of trigger circuits connected in a series chain in the manner usual for counting in the binary system but having a novel means for automatically changing the condition of stability of one or more of the trigger circuits relative to the others to depart from the binary system at a predetermined point in a counting cycle.

A further object is to provide an improved electronic counter incorporating a plurality of series connected trigger circuits and including a novel circuit for resetting or zeroizing the counter.

It is also an object to provide a novel resetting or zeroizing circuit for use with, and common to, a plurality of series connected trigger circuits which resetting circuit enables the trigger circuits to be reset quickly and accurately by a single electrical impulse and which, though common to all trigger circuits, avoids undesired switching of any of the trigger circuits because of such common connection therebetween.

According to my invention an electronic counter incorporating a plurality of series connected trigger circuits is provided in which input voltage impulses to be counted may be applied to more than one trigger circuit. The counter also includes means for determining which one of the trigger circuits to which input impulses may be applied, is to be switched by a particular input impulse. More specifically, input impulses may be applied to the first trigger circuit and to a higher trigger circuit in the chain, the higher trigger circuit being the third trigger circuit in a counter in either the scale of five or the scale of ten.

The arrangement for applying an input impulse to the higher trigger circuit is such as to result in that higher trigger circuit being switched by an input impulse only when the higher trigger circuit is in a certain one of its two stable conditions. Thus, each time the higher trigger circuit is in that certain condition, the next input impulse is effective to switch that higher trigger circuit and thereby advance the count in the counter by a number dependent upon the position of that higher trigger circuit in the chain. For example, with the input impulse applied directly to the third trigger circuit, as in a counter in the scale of five or ten, the count by this one impulse is advanced by four inasmuch as four input impulses if applied in the usual manner to the first trigger circuit only, would be required to switch the third trigger circuit.

The arrangement according to my invention for applying the input voltage impulses to be counted to the first trigger circuit is such as to result in that first trigger circuit being switched normally by each input impulse. In addition, means are provided responsive to a condition of the higher trigger circuit to which input impulses are applied to prevent the application to the first trigger circuit of the same input impulse employed to switch that higher trigger circuit. Thus, in the counter for the scale of five or ten, a condition of the third trigger circuit is effective to prevent application to the first trigger circuit of the same input impulse which switches the third trigger circuit.

It is then evident that the switching of the third trigger circuit by direct application thereto of but a single impulse, while switching of the first trigger circuit is prevented, produces counting in the quinary system with but three trigger circuits in the chain.

To prevent application to the first trigger circuit of the same input impulse which is effective to switch the third trigger circuit, a control circuit may be interposed between the source of input impulses and the first trigger circuit. The control circuit includes an electronic tube responsive to voltage conditions in the third trigger circuit to determine whether or not an input impulse is to be applied to the first trigger circuit.

To provide a bi-quinary counter for counting in the scale of ten, an additional or fourth trigger circuit is added to the chain. The fourth trigger circuit is switched with every output impulse of the third trigger circuit, i. e. with every five input impulses, and therefore provides an output impulse for every second switching thereof, which occurs, of course, with every ten input impulses counted.

The original setting and the resetting of the trigger circuits to zero conditions before a counting operation is accomplished, in accordance with my invention, by the application of a single electrical impulse to change the grid voltage of one tube of a pair of tubes in each trigger circuit. Since the grid voltage of each tube varies considerably during a normal switching operation, interconnection of the grids of tubes of all of the trigger circuits to be responsive to a single resetting impulse, while avoiding improper operation as a result of normal switching operations, involves a number of difficulties. Therefore a special and novel circuit arrangement is provided as a feature of my invention. In this special circuit arrangement, the resetting impulse is supplied through a common reset line and through individual capacitors to an intermediate point on a bias resistor in the grid circuit of the aforesaid one tube of the pair in each trigger circuit.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a table, in which are tabulated the conditions of the various tubes in the circuit of Fig. 1 during a counting operation.

Figure 1:
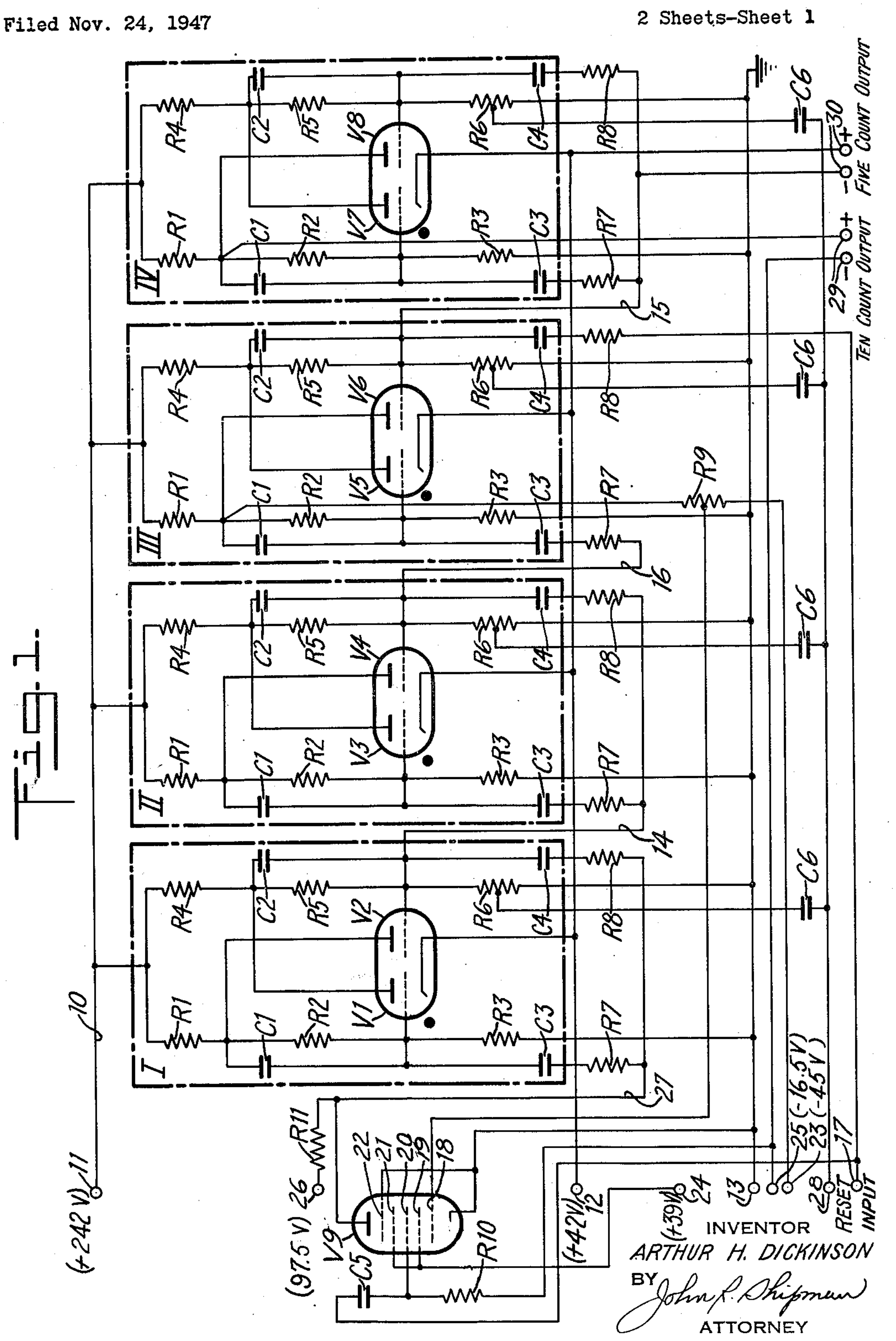
Fig. 1 is a circuit diagram illustrating one embodiment of my invention as applied to a counter for counting in the scale of five or in the scale of ten.

Referring to the drawings, in Fig. 1 the counter is shown as comprising four identical electronic trigger circuits, I, II, III and IV set off for convenience in separate broken line boxes. Each of the trigger circuits, I, II, III and IV, as illustrated, includes a twin vacuum tube comprising, in effect, two tubes within a single envelope, each having an anode, a cathode and a control grid. It will be understood, of course, that each twin tube may be replaced by two separate vacuum tubes if desired. Heating elements for all tubes and the circuits therefor have been omitted from the diagrams to afford greater clarity.

Identical elements, except the tubes, in the four trigger circuits, I, II, III and IV in Fig. 1 have the same reference characters applied thereto. For convenience in explaining the operation, the left-hand halves of the tubes of trigger circuits, I, II, III and IV are referred to as V1, V3, V5 and V7, respectively, and the right-hand halves as V2, V4, V6 and V8, respectively. As the four trigger circuits are identical, only the first trigger circuit I, will be described in detail.

The anode of tube V1 of the first trigger circuit I is connected to the anode of tube V2 through a pair of series connected resistors R1 and R4. The junction point of these resistors R1 and R4 is connected through a line 10 to a positive voltage supply terminal 11. The common cathode of tubes V1 and V2 is connected to a voltage supply terminal 12, the voltage of which is negative relative to that of terminal 11. The anode of tube V2 is coupled to the control grid of tube V1 through a resistor R2 in parallel with a capacitor C1. Similarly, the anode of tube V1 is coupled to the control grid of tube V2 through a resistor R5 in parallel with a capacitor C2. The control grids of tubes V1 and V2 are additionally connected through resistors R3 and R6, respectively, to a voltage supply terminal 13 of a voltage more negative than that of terminal 12. Voltage impulses for switching the first trigger circuit I are to be applied to the control grids of tubes V1 and V2 through capacitors C3 and C4, respectively.

The operation of a trigger circuit such as is illustrated is well known. An understanding of this operation may be facilitated if it is assumed that at some instant the grid of tube V1 is at substantially the same voltage as its cathode. Tube V1 is then highly conductive and, with the resistance of the resistor R4 properly chosen, has a very low impedance compared with that of resistor R4. The current through tube V1 is very large and the anode voltage is not much greater than that of terminal 12. With the resistance of resistors R5 and R6 properly chosen, the voltage drop across resistor R5, between the anode of tube V1 and the grid of tube V2, is sufficient to maintain the grid voltage of tube V2 below its cut-off value. Hence, tube V2 is non-conductive and its anode voltage is so high that the voltage drop across resistor R2, between the anode of tube V2 and the grid of tube V1, is not sufficient to force the grid voltage of tube V1 below the voltage of terminal 12 so that tube V1 remains highly conductive. With tube V1 highly conductive and tube V2 non-conductive, as just described, the trigger circuit is in one of its two stable conditions.

To change or switch the trigger circuit to its other stable condition, a negative impulse may be applied through the capacitor C3 to the grid of tube V1. Current limiting resistors R7 and R8 are connected in series with capacitors C3 and C4, respectively, for each trigger circuit in Fig. 1, so that voltage impulses supplied to the grids of the tubes pass through the resistors R7 and R8 as well. It is to be noted that in trigger circuits I, II, and IV, the lower ends of resistors R7 and R8 are connected together to receive an impulse simultaneously so that an impulse is effective, as explained hereinafter, to switch these trigger circuits from either stable condition to the other.

When the negative impulse is applied to the grids of tubes V1 and V2, and with tube V2 non-conductive, as set forth above, no direct effect is produced on tube V2 since that tube is already non-conductive. However, the application of the negative impulse to the grid of tube V1 causes the voltage of the grid to become more negative, so that current flow through resistor R4 and the tube V1 to terminal 12 is reduced. This causes the voltage of the anode end of resistor R4 to rise very rapidly so that a positive voltage impulse is applied through the capacitor C2 and renders the grid of tube V2 more positive. Thus the voltage of the grid of tube V2 rises quickly to a value above the cut-off value and current flow through tube V2 and its plate resistor R1 starts substantially instantaneously.

When the tube V2 thus becomes conductive, the voltage at the anode end of resistor R1 drops rapidly to cause a negative voltage impulse to be fed through capacitor C1 to the grid of tube V1, augmenting the negative impulse received through resistor R7 and capacitor C3 so that if the grid voltage of tube V1 has not already been dropped below the cut-off value, this lowered anode voltage of tube V2 results in a further decrease in the grid voltage of tube V1 and a corresponding increase in the anode voltage of tube V1 to increase the grid voltage of tube V2. This action continues until tube V1 is non-conductive and tube V2 is highly conductive. The lowered anode voltage of tube V2 with the voltage drop across resistor R2 tends to maintain tube V1 non-conductive thereafter. This second condition in which the tube V1 is non-conductive and the tube V2 is highly conductive is the second stable condition of the trigger circuit.

The trigger circuit is maintained in the second stable condition until another or second negative impulse is applied to the grids of tubes V1 and V2. This second negative impulse drops the voltage of the grid of the conductive tube V2, producing an increase in the anode voltage thereof to transmit a positive impulse to the grid of the non-conductive tube V1 and tube V1 thereupon begins to conduct current and the resulting drop in its anode voltage is applied to the grid of tube V2 to drop the voltage thereof below the cut-off value. Tube V2 then becomes non-conductive and tube V1 conductive, so that the trigger circuit is again in its first stable condition.

It will be understood that when tube V2 is conductive and tube V1 is non-conductive, every point on the right-hand resistor network comprising resistors R4, R5 and R6 is at the higher of two voltages and every point on the left-hand resistor network comprising resistors R1, R2 and R3 is at the lower of two voltages. In the other stable condition, when tube V1 is conductive and tube V2 is non-conductive, every point on the resistor network R1, R2 and R3 is at the higher of two voltages and every point on the resistor network R4, R5 and R6 is at the lower of two voltages. This condition enables an output voltage impulse to be taken from the trigger circuit through a lead wire 14 connected to a point intermediate resistor R5, in parallel with capacitor C2, and resistor R6, in parallel with capacitor C4 Thus, when tube V2 is conductive, this intermediate point is at the higher of two voltages and the voltage of the lead wire 14 is relatively high When the trigger circuit is thereafter switched and tube V1 becomes conductive, a negative voltage impulse is supplied through the output lead wire 14. From the foregoing it is apparent that such a negative voltage impulse is supplied through output lead wire 14, once, for every two negative impulses applied to the grids of tubes V1 and V2.

The output lead wire 14 from the first trigger circuit I is connected to the grids of both tubes V3 and V4 of the second trigger circuit II through the associated resistors and capacitors R7 and C3, and R8 and C4. Similarly, the output lead wire 15 of the third trigger circuit III is connected to the grids of both tubes V7 and V8 of the fourth trigger circuit IV. It is to be particularly noted, however, that the output lead wire 16 of trigger circuit II is connected to the grid of tube V5, only, of trigger circuit III, the grid of tube V6 being connected, through the associated capacitor C4 and resistor R8, directly to an input terminal 17.

It should also be pointed out at this time that while both negative and positive voltage impulses are supplied at different times through the output lead wires 14, 16 and 15 of trigger circuits I, II and III, respectively, it is well known that because of the grid current in tubes V2, V4 and V6, the positive impulse does not have as steep a wave front nor as great a peak magnitude as the negative impulse. Therefore, the values of resistors and capacitors in the grid circuits of the tubes in the trigger circuits supplied with impulses through lead wires 14, 16 and 15, may be and are chosen so that only the negative impulses are effective to switch the trigger circuit so supplied.

Input impulses to be counted are supplied in the form of positive voltage impulses from a suitable source, not shown, through the input terminal 17. These positive input impulses are applied via resistor R8 and capacitor C4, as described above, to the grid of the tube V6 in trigger circuit III. These positive impulses are also applied through an intermediate control circuit, presently described, to the grids of tubes V1 and V2 of the first trigger circuit I. This control circuit, as shown in Fig. 1, comprises a multigrid vacuum tube V9 having an anode, a cathode and five grids 18, 19, 20, 21 and 22. The first or lowest grid 18, which is a control grid hereinafter referred to as the blocking grid, is connected to a tap on a load resistor R9 which in turn is connected between the anode of tube V6 in the third trigger circuit III and a voltage supply terminal 23 the voltage of which is negative relative to that of terminal 13. The second and fourth grids 19 and 21, respectively, which comprise screen grids, are connected together and to a voltage supply terminal 24, the voltage of which is negative relative to that of terminal 12 but positive relative to that of terminal 13. The third grid 20, which is also a control grid, is connected to a point intermediate a capacitor C5 and a resistor R10, which capacitor and resistor are connected in series between the input terminal 17 and a voltage supply terminal 25, the voltage of which is negative relative to that of terminal 13 but is positive relative to that of terminal 23. The upper or fifth grid 22, which is a suppressor grid, is connected directly to the cathode.

It is to be noted that when the tube V6 in the third trigger circuit III is non-conductive, its anode is at a high positive voltage resulting in the application, through resistor R9, to the blocking grid 18 of the control tube V9, of a voltage sufficiently positive to permit that tube to become highly conductive upon a voltage, above the cut-off value being simultaneously applied to the third of control grid 20. On the other hand when the tube V6 is conductive, its anode voltage is reduced resulting in the application to the blocking grid 18 of the control tube V9 of a voltage which prevents the control tube from becoming conductive regardless of the voltage on the control grid 20 thereof.

The anode of control tube V9 is connected through a resistor R11 to a voltage supply terminal 26, the voltage of which is negative relative to that of terminal 11 but is positive relative to that of terminal 12. The cathode of the control tube V9 is connected to the terminal 13. The anode of tube V9 is also connected through the input lead wire 27 and the resistor-capacitor combinations, R7 and C3, and R8 and C4 to the grids of tubes V1 and V2 of the first trigger circuit I.

When a positive input impulse is applied to input terminal 17, it is applied through the capacitor C5 to the control grid 20 of control tube V9. Normally the voltage difference between terminal 13, to which the cathode of the control tube V9 is connected, and terminal 25, to which the control grid 20 is connected, renders grid 20 sufficiently negative to maintain control tube V9 non-conductive. However, such a positive input impulse applied through capacitor C5, raises the voltage of the control grid 20 so that control tube V9 will become momentarily conductive, unless tube V6 of the third trigger circuit III is conductive causing the blocking grid 18 to block the tube, as pointed out above.

When the control tube V9 conducts, a voltage drop is produced across the resistor R11 and the anode voltage of the control tube V9 drops so that a negative voltage input impulse is supplied to the grids of tubes V1 and V2 of the first trigger circuit I. If, however, tube V6 of trigger circuit III, is conductive at the time said positive input impulse is applied to the control grid 20 of tube V9, the voltage of blocking grid 18 is so negative that it prevents the control tube from becoming conductive. In this case, a negative operating impulse will not be supplied to trigger circuit I.

It has been previously pointed out that positive input impulses appearing at the input terminal 17 are applied to the grid of tube V6 in the third trigger circuit III and may be reversed in polarity and applied, by means of the control circuit, to the grids of tubes V1 and V2 in the first trigger circuit I. It has also been explained that the application of a negative impulse to the first trigger circuit I is effected when tube V6 of the third trigger circuit III is non-conductive but is prevented when this tube V6 is conductive. The effect of a positive input impulse on trigger circuit III will now be considered.

If the tube V6 of trigger circuit III is non-conductive at the time a positive input impulse is applied to the grid thereof, the trigger circuit III is not switched for the positive input impulse does not have sufficient magnitude to raise the grid of tube V6 above the cut-off value. However, if tube V6 of trigger circuit III is conductive at the time a positive input impulse is supplied to its grid from the input terminal 17, it has been found experimentally that this impulse (although a positive impulse) is effective to switch the trigger circuit III. Even though tube V6 is already conductive, the positive input impulse applied to its grid causes that tube to become non-conductive and tube V5 to become conductive. The reason for such action is not fully understood but it has been repeatedly proven in the circuit illustrated in Fig. 1 which was constructed and operated. It is noted that the load of the trigger circuit III is different from the load of the other trigger circuits in that the resistor R9 is conductively connected between the anode of said tube V6 and the terminal 23. In addition, the grid circuits of trigger circuit III are different from the grid circuits of the other trigger circuits in that they have no interconnection at the lower ends of resistors R7 and R8. These differences may have some bearing upon the fact that trigger circuit III is switched by the application of a positive input impulse to the grid of its tube V6 when that tube is already conductive. It seems probable, from tests conducted on this circuit and similar circuits, that the switching effect may be produced by the trailing edge of the positive impulse and that the reduction in grid voltage which occurs at the trailing edge of the positive impulse causes the current flow through tube V6 to be reduced and thus initiates the switching action typical of such trigger circuits. In any event the positive impulse was consistently effective, in apparatus tested, to switch the trigger circuit III under the conditions set forth.

Before placing the counter into operation, either initially or following a previous count, it is necessary to zeroize or reset the system. Preferably such resetting is to be accomplished substantially instantaneously and, as previously indicated, by a single electrical impulse.

A novel resetting arrangement is provided in Fig. 1 wherein capacitors C6 are connected, respectively, between an intermediate tap on the bias resistor R6 for each of tubes V2, V4, V6 and V8 in trigger circuits I, II, III and IV and a common reset terminal 28. Of course, at any instant after the trigger circuits are connected to the supply terminals, one tube in each trigger becomes conductive. By applying a single negative voltage impulse to the reset terminal 28 from a suitable source, not shown, any of the right-hand tubes V2, V4, V6 and V8 of the four trigger circuits I, II, III and IV which may be conductive, at the time, are rendered non-conductive, while those which may be non-conductive remain so. Thus, the counter is zeroized or reset to place each of the trigger circuits in that particular stable condition in which the left-hand tube thereof is conductive. A dot is shown in Fig. 1 alongside each of tubes V1, V3, V5, and V7 to indicate they are conductive in the zeroized state.

As previously set forth, the voltage at the grids of tubes V2, V4, V6 and V8 change substantially with switching of the associated trigger circuits and each of the grid voltages of tubes V2, V4, and V6 is actually used to supply operating impulses to other trigger circuits. It is thus evident that if the grids of these tubes were connected directly and conductively to a common line, the counter would not function properly. In accordance with my invention each of the grids is connected to the common reset line through the upper portion of resistor R6 and the capacitor C6. The voltage changes across the lower portion of the resistor R6 between the tap and the constant voltage terminal 13 as a result of the switching of the corresponding trigger circuit, are sufficiently low that undesired switching of other trigger circuits thereby is avoided.

The resetting arrangement just described is particularly advantageous where the counter is a part of a larger calculating machine and a very high speed, non-mechanical resetting operation is desired. The single reset impulse may be supplied as a result of other calculating machine operations and effects a rapid and accurate resetting of the trigger circuits while maintaining cross-talk therebetween very low to avoid improper counting operations because of the common reset connection.

As illustrated in Fig. 1, a pair of ten count output terminals 29 are provided, one of which is connected to the plate of tube V8 in the fourth trigger circuit IV and the other to the negative terminal 25. It will become apparent later that a consideration of the operation of the counter that a voltage impulse appears across the ten count output terminals of the polarity indicated in Fig. 1, once for each ten input impulses counted.

A pair of five count output terminals 30 are also provided, one of which is connected to the output lead wire 15 of the third trigger circuit and the other to the terminal 12, and a voltage impulse of the indicated polarity appears thereacross once for each five input impulses counted.

The operation of the circuit shown in Fig. 1 will be better understood by reference to the table shown in Fig. 2. As indicated in this table, the left-hand tubes V1, V3, V5 and V7 of the trigger circuits I, II, III and IV, respectively, are conductive in the zeroized state prior to application of the first positive input impulse to be counted. The first positive input impulse is supplied to the grid of tube V6 of the third trigger circuit III and also to the multigrid control tube V9. However, inasmuch as tube V5 of trigger circuit III is conductive at this time, and therefore tube V6 is non-conductive, this first input impulse has no effect upon trigger circuit III.

This first positive input impulse applied to control tube V9 causes its control grid 20 to rise above the cut-off value, and, since tube V8 is now non-conductive, the voltage on the blocking grid 18 is high so that the positive impulse on the control grid 20 renders the control tube V9 conductive. As a result the positive input impulse applied to control tube V9 is changed in polarity to a negative impulse and is then applied to the grids of tubes V1 and V2 of the first trigger circuit I to switch it. Consequently, tube V1 of trigger circuit I becomes non-conductive and tube V2 becomes conductive, as illustrated for input impulse No. 1 of Fig. 2.

The second positive input impulse likewise has no direct effect upon the third trigger circuit III but causes the first trigger circuit I to be switched again so that tube V1 becomes conductive and tube V2 becomes non-conductive. As tube V2 of the first trigger circuit I becomes non-conductive upon the second input impulse applied, a negative impulse is applied through lead wire 14 to the grids of tubes V3 and V4 of the second trigger circuit II. This switches trigger circuit II so that its tube V3 now becomes non-conductive and its tube V4 becomes conductive, as illustrated in Fig. 2.

The third positive input impulse does not affect trigger circuit III but this impulse does switch the first trigger circuit I, without, however, switching the second trigger circuit II, as is seen from Fig. 2.

The fourth positive input impulse still does not directly affect the third trigger circuit III since, as stated above, tube V6 is non-conductive. However, this fourth input impulse acts through control tube V9 to switch the first trigger circuit I which thereupon supplies a negative impulse to the second trigger circuit II to switch that circuit. When the second trigger circuit II is switched, its tube V3 becomes conductive and its tube V4 becomes non-conductive, as shown in Fig. 2, and a negative output impulse is supplied to the grid of tube V5 of trigger circuit III. This negative impulse on the grid of tube V5 causes it to conduct less current and through the well known action of the associated capacitors C2 and C1 and resistors R5 and R2, tube V5 becomes non-conductive and tube V6 becomes conductive.

As will now be evident, the fifth positive input impulse is effective through its direct application to the grid of tube V6 to cause trigger circuit III to be switched, inasmuch as tube V6 was conductive at the time of application of this fifth input impulse. When the third trigger circuit is thus switched, its tube V6 again becomes non-conductive. However, at the time of application of the fifth positive input impulse, tube V6 was conductive and therefore the voltage on the blocking grid 18 of control tube V9 is sufficiently negative to prevent the control tube from responding to the fifth positive input impulse. It follows, therefore, that the fifth input impulse has no effect on the first trigger circuit I and thus the third trigger circuit III only is switched by the fifth positive input impulse.

As can be seen from the table of Fig. 2, the fifth positive input impulse produces a pattern of stable conditions in the first three trigger circuits, I, II and III, which pattern is the same as that existing prior to the first input impulse. This pattern will be repeated with each succeeding five input impulses counted.

The switching of the third trigger circuit III by the fifth positive input impulse, produces a negative impulse on the output lead wire 15 associated therewith and an impulse of the indicated polarity across the five count output terminals 30. Thus, the first three trigger circuits form a quinary counter and provide an output impulse for every five input impulses.

To provide, from the quinary counter, a counter in the scale of ten, the fourth trigger circuit IV in Fig. 1 is connected to receive the output impulse provided by the third trigger circuit III for every fifth positive input impulse. As trigger circuit III is switched upon application of the first such fifth input impulse, trigger circuit IV is switched by the output impulse supplied by trigger circuit III, as is seen from Fig. 2.

Trigger circuit IV remains in this new stable condition, as is seen from Fig. 2, until the second such fifth input impulse (i. e. the tenth input impulse counted), whereupon trigger circuit III is again switched to that condition with its tube V5 conductive, to provide a second negative impulse over lead 15 which thereupon switches trigger circuit IV to render its tube V7 conductive. Thus, upon the tenth input impulse a voltage output impulse of the indicated polarity appears across the ten count output terminals 29.

It is now evident that the counter disclosed herein avoids the use of feedback capacitors with the resultant necessary delays. By having the control circuit interposed between the source of input impulses and the first trigger circuit to determine whether or not an operating impulse is supplied to the first trigger circuit, there is also avoided any disturbance whatsoever of the voltage conditions existing in the first trigger circuit when that trigger circuit is not to be switched by an input impulse. This likewise aids in permitting high speed operation of the counter.

The counter disclosed herein may be advantageously employed in many ways. For example, it may be used as the units order of an electronic counter having a plurality of orders. In such case the ten count output terminal 29 connected to the anode of tube V8 is employed as the input terminal of another circuit, identical with Fig. 1, which functions as a tens order in the counter with the same supply voltage terminals employed for both orders. Similarly the output of the tens order may be utilized to operate a hundreds order.

In a typical counter actually constructed and connected as shown in Fig. 1 and operated satisfactorily, the various circuit components were of the following values or types:

| Tubes | Resistors | Capacitors |
|---|---|---|
| | *Ohms* | *Mmfds.* |
| (V1—V2)=6SC7 | R1=100,000 | C1=250 |
| (V3—V4)=6SC7 | R2=300,000 | C2=250 |
| (V5—V6)=6SC7 | R3=100,000 | C3=100 |
| (V7—V8)=6SC7 | R4=100,000 | C4=100 |
| V9=1R5 | R5=300,000 | C5=100 |
| | R6=100,000 | C6=100 |
| | R7=100,000 | |
| | R8=100,000 | |
| | R9=1,000,000 | |
| | R10=250,000 | |
| | R11=100,000 | |

The supply terminals had the following voltages:

11=+242 volts
12=+42 volts
13=0 volts
23=−45 volts
24=+39 volts
25=−16 5 volts
26=+97.5 volts While there have been shown and described and pointed out the fundamental novel features of the invention as applied to a specific embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

What is claimed is:

In an electronic counter, the combination comprising three trigger circuits, each including a pair of impedance networks connected in parallel across a voltage supply with an electronic tube respectively incorporated in each network, said tubes determining, in accordance with their status with respect to conductivity, the electrical conditions of the networks and each tube having control means coupled into the other network causing relatively opposite electrical conditions to co-exist in the two networks tending to mutually sustain one another but which conditions may be reversed by the application of an operating voltage impulse to the control means of one of said tubes and then reversed again by the application of an operating voltage impulse to the other tube, whereby each trigger circuit has two conditions of stability to which it may be switched alternately; first circuit means interconnecting the first and second trigger circuits whereby the first trigger circuit upon switching to one of its stable conditions transmits an operating impulse to the control means of both tubes of said second trigger circuit; second circuit means interconnecting said second and third trigger circuits whereby the second trigger circuit upon switching to one of its stable conditions transmits an operating impulse to the control means of one tube of said third trigger circuit; means functioning as a source of spaced operating impulses connected directly to the control means of the other tube of said third trigger circuit to supply operating impulses thereto; and third circuit means connecting said source to the control means of both tubes of said first circuit to supply operating impulses thereto but including valve means responsive to electrical conditions in the third trigger circuit when it is in a stable condition reversable by an impulse on the control means of the other tube thereof to prevent application of an impulse from said source to the first trigger circuit.

ARTHUR H. DICKINSON.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,407,320 | Miller | Sept. 10, 1946 |

OTHER REFERENCES

Review of Scientific Instruments, vol. 9, Mar. 1938, A Triode Vacuum Tube Scale-of-Two Circuit, by Lifschutz et al., pages 83–89. (Copy in Scientific Library.)